(12) United States Patent
Shen et al.

(10) Patent No.: US 12,526,827 B2
(45) Date of Patent: Jan. 13, 2026

(54) RESOURCE SELECTION METHOD AND DEVICE, AND TERMINAL DEVICE

(71) Applicant: DATANG GOHIGH INTELLIGENT AND CONNECTED TECHNOLOGY (CHONGQING) CO., LTD., Chongqing (CN)

(72) Inventors: Tianjun Shen, Beijing (CN); Rui Zhao, Beijing (CN); Yakun Wang, Beijing (CN); Chenxin Li, Beijing (CN)

(73) Assignee: DATANG GOHIGH INTELLIGENT AND CONNECTED TECHNOLOGY (CHONGQING) CO., LTD., Chongqing (CN)

( * ) Notice: Subject to any disclaimer, the term of this patent is extended or adjusted under 35 U.S.C. 154(b) by 393 days.

(21) Appl. No.: 18/248,860

(22) PCT Filed: Oct. 22, 2021

(86) PCT No.: PCT/CN2021/125900
§ 371 (c)(1),
(2) Date: Apr. 12, 2023

(87) PCT Pub. No.: WO2022/083767
PCT Pub. Date: Apr. 28, 2022

(65) Prior Publication Data
US 2023/0403730 A1  Dec. 14, 2023

(30) Foreign Application Priority Data
Oct. 23, 2020 (CN) .......................... 202011149076.2

(51) Int. Cl.
*H04W 72/40* (2023.01)
(52) U.S. Cl.
CPC .................................. *H04W 72/40* (2023.01)
(58) Field of Classification Search
CPC ..... H04W 72/25; H04W 72/06; H04W 72/02; H04W 72/563; H04W 4/40;
(Continued)

(56) References Cited

U.S. PATENT DOCUMENTS

2020/0008234 A1   1/2020   Li et al.
2021/0345145 A1*  11/2021  Sarkis ....................... H04L 5/16
(Continued)

FOREIGN PATENT DOCUMENTS

| CN | 110139373 A | 8/2019 |
|---|---|---|
| CN | 110178402 A | 8/2019 |

(Continued)

OTHER PUBLICATIONS

International Search Report for PCT Application No. PCT/CN2021/125900 issued on Jan. 10, 2022 and its English Translation provided by WIPO.
(Continued)

*Primary Examiner* — Rushil P. Sampat
(74) *Attorney, Agent, or Firm* — Ladas & Parry, LLP

(57) ABSTRACT

A resource selection method, a resource selection device and a terminal device are provided, which relate to the field of communication technology. The resource selection method includes: determining content of sidelink resource coordination information; transmitting the sidelink resource coordination information.

20 Claims, 4 Drawing Sheets

(58) Field of Classification Search
CPC . H04W 72/0446; H04W 72/53; H04W 72/56; H04W 76/14; H04W 72/40; H04W 92/18; H04L 5/16
See application file for complete search history.

(56) References Cited

U.S. PATENT DOCUMENTS

| | | | |
|---|---|---|---|
| 2022/0248417 A1 | 8/2022 | Yang | |
| 2022/0322359 A1* | 10/2022 | Ye | H04W 72/0446 |
| 2023/0247654 A1* | 8/2023 | Zhang | H04W 72/40 370/329 |
| 2023/0389051 A1* | 11/2023 | Leon Calvo | H04W 72/25 |

FOREIGN PATENT DOCUMENTS

| | | |
|---|---|---|
| CN | 110383866 A | 10/2019 |
| CN | 111294755 A | 6/2020 |
| CN | 111757345 A | 10/2020 |
| CN | 112333661 A | 2/2021 |
| WO | 2018195826 A1 | 11/2018 |
| WO | 2020011336 A1 | 1/2020 |
| WO | 2022077326 A1 * | 4/2022 |

OTHER PUBLICATIONS

Written Opinion for PCT Application No. PCT/CN2021/125900 issued on Jan. 10, 2022 and its English Translation provided by WIPO.

International Preliminary Report on Patentability for PCT Application No. PCT/CN2021/125900 issued on Apr. 13, 2023 and its English Translation provided by WIPO.

"Resource Allocation Enhancements for Mode 2," 3GPP TSG RAN WG1 Meeting #102-e, R1-2005537, e-Meeting, Aug. 17-28, 2020, Source: Fraunhofer HHI, Fraunhofer IIS, Agenda item: 8.11.2.2, all pages.

"Feasibility and benefits of mode 2 enhancements for inter-UE coordination," 3GPP TSG-RAN WG1 Meeting @102-e, R1-2006445, Agenda Item: 8.11.2.2, Source: Ericsson, all pages.

First Office Action and search report for the corresponding Chinese Patent Application No. 202011149076.2 issued by the Chinese Patent Office on Feb. 14, 2022 and its English translation provided by foreign associate.

"Discussion on Inter-UE Coordination for Mode 2 Resource Allocation," 3GPP TSG RAN WG1 #103-e, R1-2008447, e-Meeting, Oct. 26-Nov. 13, 2020, Agenda Item: 8.11.2.2, Source: Apple, all pages.

Extended European Search Report for European Patent Application No. 21882179.1 issued by the European Patent Office on Feb. 5, 2024.

"Inter-UE coordination in mode-2" 3GPP TSG RAN WG1 #102-e, R1-2005961, e-Meeting, Aug. 17-28, 2020, Source: ZTE, Sanechips, Agenda Item: 8.11.2.2.

"Inter-UE coordination for mode 2 enhancement," 3GPP TSG RAN WG1 #103-e, R1-2008892, e-Meeting, Oct. 26-Nov. 13, 2020, Agenda Item: 8.11.2.2, Source: ITL, KRRI.

Office Action for Japanese Patent Application No. 2023-524697 issued by the Japanese Patent Office on Jan. 30, 2024, and its English translation provided by the foreign associate.

"Discussion of feasibility and benefit of mode 2 enhancements," 3GPP TSG RAN WG1 #102-e, R1-2006268, e-Meeting, Aug. 17-28, 2020, Agenda Item: 8.11.2.2, Source: Spreadtrum Communications.

* cited by examiner

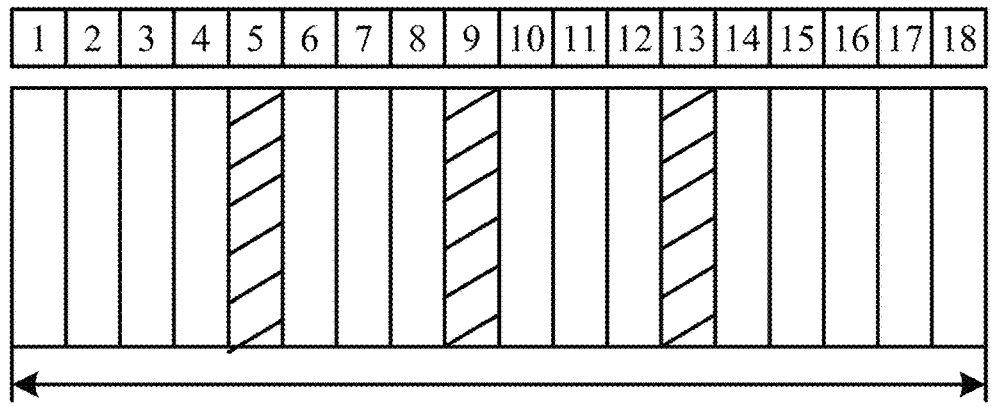
Fig. 4
Fig. 5
Fig. 6
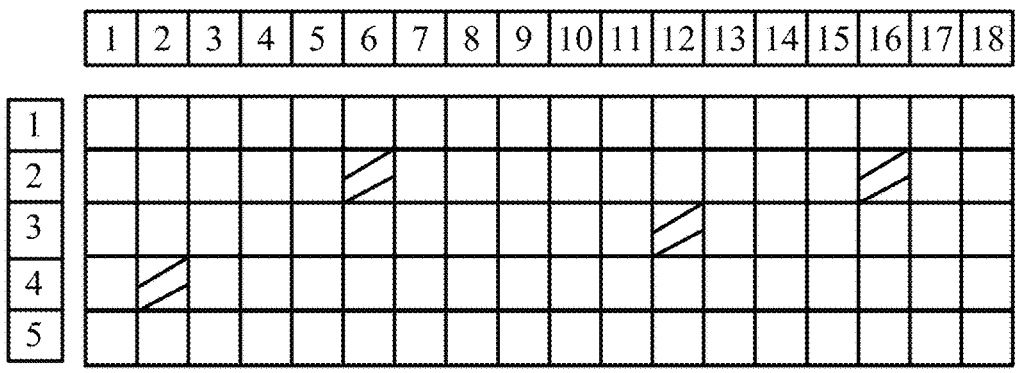
Fig. 7

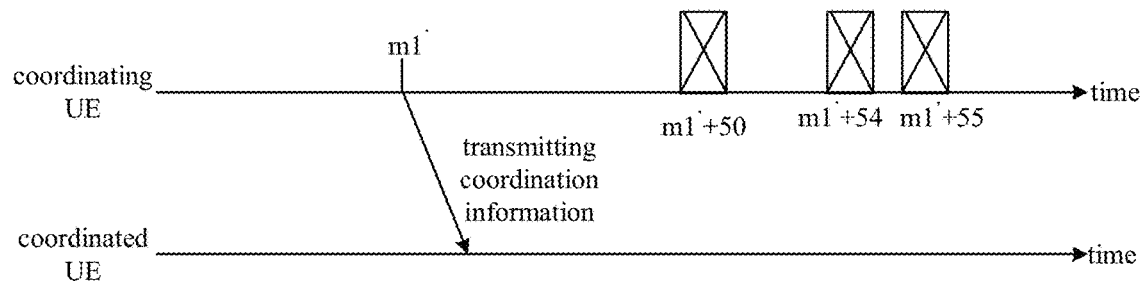
Fig. 8
| 86 | 81 | 76 | 71 | 66 | 61 | 56 | 51 | 46 | 41 | 36 | 31 | 26 | 21 | 16 | 11 | 6 | 1 |
|----|----|----|----|----|----|----|----|----|----|----|----|----|----|----|----|----|----|
| 87 | 82 | 77 | 72 | 67 | 62 | 57 | 52 | 47 | 42 | 37 | 32 | 27 | 22 | 17 | 12 | 7 | 2 |
| 88 | 83 | 78 | 73 | 68 | 63 | 58 | 53 | 48 | 43 | 38 | 33 | 28 | 23 | 18 | 13 | 8 | 3 |
| 89 | 84 | 79 | 74 | 69 | 64 | 59 | 54 | 49 | 44 | 39 | 34 | 29 | 24 | 19 | 14 | 9 | 4 |
| 90 | 85 | 80 | 75 | 60 | 65 | 60 | 55 | 50 | 45 | 40 | 35 | 30 | 25 | 20 | 15 | 10 | 5 |
Fig. 9
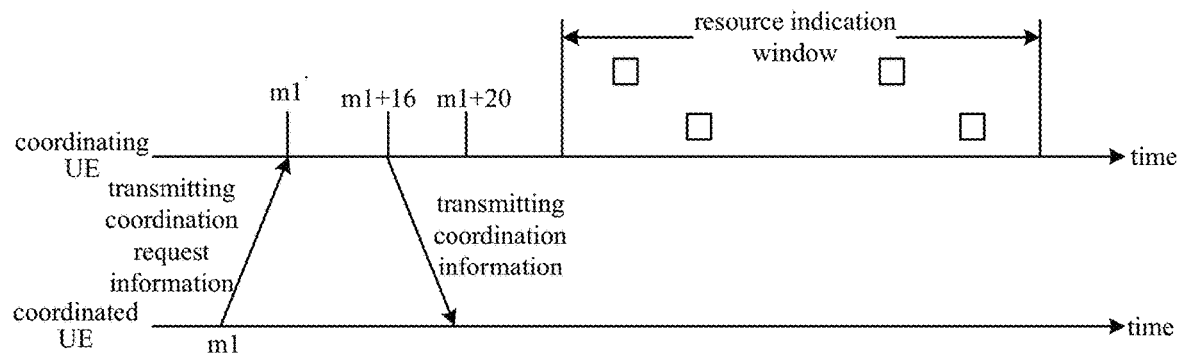
Fig. 10

RESOURCE SELECTION METHOD AND DEVICE, AND TERMINAL DEVICE

CROSS-REFERENCE TO RELATED APPLICATIONS

This application is the U.S. national phase of PCT Application No. PCT/CN2021/125900 filed on Oct. 22, 2021, which claims a priority to the Chinese patent application No. 202011149076.2 filed in China on Oct. 23, 2020, the disclosures of which are incorporated herein by reference in their entireties.

TECHNICAL FIELD

The present disclosure relates to the field of communication technology, in particular to a resource selection method, a resource selection device, and a terminal device.

BACKGROUND

In a resource allocation mechanism in a Release 16 (Rel-16) New Radio (NR)-Vehicle to X (V2X) mode 2, a resource selection process for a User Equipment (UE) is described as follows.

A) The UE excludes, in accordance with its own sensing result, resources which are reserved in a resource selection window and where Reference Signal Receiving Power (RSPR) of a received Physical Sidelink Shared Channel (PSSCH) is greater than an RSRP threshold from the resource selection window. The RSRP threshold is determined in accordance with a priority value of a received service data packet and a priority value of a to-be-transmitted service data packet.

B) A proportion of available resources is determined after the resource exclusion. When the proportion of the available resources is smaller than X % of the total quantity of resources in the resource selection window, the RSRP threshold is increased by 3 dB, and a resource exclusion process in the above step A) is repeated until the proportion of the available resources is greater than or equal to X %.

C) The UE randomly selects resources desired for transmission from the available resources.

However, there are such problems as half duplex and hidden nodes in the resource allocation mechanism. In order to solve these problems, an inter-UE coordination mechanism has been presented for the resource allocation. However, in the inter-UE coordination mechanism, there are such problems as a too large overhead for coordination information, insufficient timeliness of the coordination information, and the container of the coordination information is uncertain due to an uncertain overhead for the coordination information.

SUMMARY

An object of the present disclosure is to provide a resource selection method, a resource selection device and a terminal device, so as to solve such problems as a large overhead for coordination information, insufficient timeliness of the coordination information as well as an uncertain container of the coordination information.

In a first aspect, the present disclosure provides in some embodiments a resource selection method for a coordinating UE in a V2X sidelink system, including: determining content of sidelink resource coordination information; and transmitting the sidelink resource coordination information.

In a second aspect, the present disclosure provides in some embodiments a terminal device, including a transceiver, a memory, a processor, and a computer program stored in the memory and configured to be executed by the processor. The processor is configured to execute the computer program to implement the resource selection method in the first aspect.

In a third aspect, the present disclosure provides in some embodiments a resource selection device for a coordinating UE in a V2X sidelink system, including: a determination module configured to determine content of sidelink resource coordination information; and a transmission module configured to transmit the sidelink resource coordination information.

In a fourth aspect, the present disclosure provides in some embodiments a computer-readable storage medium storing therein a computer program. The computer program is executed by a processor to implement the resource selection method in the first aspect.

The present disclosure has the following beneficial effects.

According to the embodiments of the present disclosure, the coordinating UE in the V2X sidelink system determines the contents of the sidelink resource coordination information, and transmits the sidelink resource coordination information. As a result, it is able to limit the coordination information with respect to time, thereby to ensure the timeliness of the coordination information, reduce an overhead for the coordination information and prevent the overhead for the coordination information from being too large. In addition, it is able to provide a relatively constant overhead for the coordination information, thereby to conveniently determine a container of the coordination information.

BRIEF DESCRIPTION OF THE DRAWINGS

FIG. 4 is a schematic view showing indices of the slots in the resource indication window according to an embodiment of the present disclosure;

FIG. 5 is a schematic view showing time-frequency resources in the resource indication window according to an embodiment of the present disclosure;

FIG. 6 is a schematic view showing index numbers of the time-frequency resources in the resource indication window according to an embodiment of the present disclosure;

FIG. 7 is a schematic view showing two-dimensional coordinates of time domain-frequency domain in the resource indication window according to an embodiment of the present disclosure;

FIG. 8 is a schematic view showing the transmission of the time-domain resource by a coordinating UE according to an embodiment of the present disclosure;

FIG. 9 is a schematic view showing a time-frequency resource indication window for the coordinating UE according to an embodiment of the present disclosure;

FIG. 10 is a schematic view showing a maximum delay for the transmission of coordination information by the coordinating UE according to an embodiment of the present disclosure;

DETAILED DESCRIPTION

In order to make the objects, the technical solutions and the advantages of the present disclosure more apparent, the present disclosure will be described hereinafter in details in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, in the embodiments of the present disclosure, serial numbers of the steps shall not be used to define the order of the steps, and instead, the order of the steps shall be determined in accordance with their functions and internal logics.

In addition, the terms "system" and "network" may be replaced with each other in the present disclosure.

It should be appreciated that, the expression "B corresponding to A" means that B is associated with A and may be determined in accordance with A. However, when B is determined in accordance with A, it means that B may be determined in accordance with A and/or any other information.

In the embodiments of the present disclosure, a user terminal device may be a mobile phone or any other device capable of transmitting or receiving a radio signal, including a UE, a Personal Digital Assistant (PDA), a wireless modem, a wireless communication device, a handheld device, a laptop computer, a cordless telephone, a Wireless Local Loop (WLL) station, a Customer Premise Equipment (CPE) or an Mifi capable of converting a mobile signal into a Wireless Fidelity (WiFi) signal, an intelligent household electrical appliance, or any other device capable of spontaneously communicating with a mobile communication network.

Figure 1:
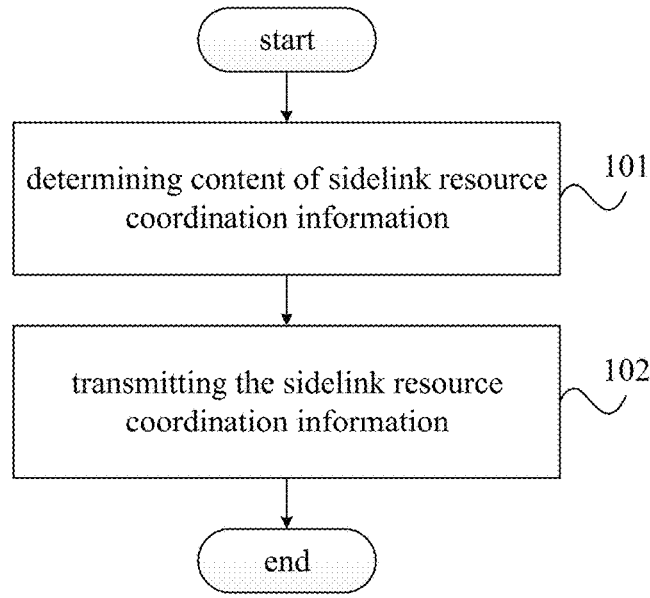
FIG. 1 is a flow chart of a resource selection method according to an embodiment of the present disclosure.

As shown in FIG. 1, the present disclosure provides in some embodiments a resource selection method for a coordinating UE of a Vehicle to Everything (V2X) sidelink system, which includes the following steps.

Step 101: determining content of sidelink resource coordination information.

Here, it should be appreciated that, upon the reception of sidelink resource coordination request information from the coordinated UE, a coordinating UE may determine the content of the sidelink resource coordination information in accordance with content of the sidelink resource coordination request information. When inter-UE coordination is triggered by the coordinating UE in accordance with a predetermined condition, the coordinating UE may determine the content of the sidelink resource coordination information in accordance with a predetermined rule.

Step 102: transmitting the sidelink resource coordination information.

Through transmitting the sidelink resource coordination information to a target coordinated UE, the target coordinated UE may determine resources for transmitting a to-be-transmitted packet in accordance with the content of the sidelink resource coordination information.

According to the resource selection method in the embodiments of the present disclosure, the coordinating UE determines the sidelink resource coordination information and then transmits the sidelink resource coordination information, so as to limit the transmission of the sidelink resource coordination information with respect to time, prevent the occurrence of a too large overhead for the sidelink resource coordination information, and improve the timeliness of the sidelink resource coordination information. In addition, it is able to provide a certain overhead for the sidelink resource coordination information, thereby to determine a container of the sidelink resource coordination information conveniently.

In a possible embodiment of the present disclosure, the determining the content of the sidelink resource coordination information includes: determining a resource indication window for selecting a coordination resource; determining a type of the coordination resource; and determining the coordination resource included in the sidelink resource coordination information in the resource indication window in accordance with the type of the coordination resource.

Here, it should be appreciated that, in the embodiments of the present disclosure, the determining the resource indication window specifically includes determining a start time and an end time of the resource indication window. The start time and the end time may be determined in different ways in accordance with a condition for triggering the inter-UE coordination. The determining the type of the coordination resource specifically includes determining the type of the coordination resource transmitted to the coordinated UE, such as a type of an available time-domain resource, a type of an available time-frequency resource, a type of an unavailable time-domain resource, a type of an unavailable time-frequency resource, and a scheduled time-frequency resource. The determining the coordination resource in the resource indication window in accordance with the type of the coordination resource specifically includes determining a resource corresponding to the type of the coordination resource in the resource indication window.

In another possible embodiment of the present disclosure, the determining the content of the sidelink resource coordination information includes: determining a resource indication window for selecting a coordination resource; determining a type of the coordination resource; obtaining priori information for determining the coordination resource; determining an end time of a resource sensing window; and determining the coordination resource included in the sidelink resource coordination information in the resource indication window in accordance with the priori information, the type of the coordination resource and the resource sensing window.

Identically, in the embodiments of the present disclosure, the determining the resource indication window specifically includes determining a start time and the end time of the resource indication window. The start time and the end time may be determined in different ways in accordance with a condition for triggering the inter-UE coordination. The determining the type of the coordination resource specifically includes determining the type of the coordination resource transmitted to the coordinated UE, such as a type of an available time-domain resource, a type of an available time-frequency resource, a type of an unavailable time-domain resource, a type of an unavailable time-frequency resource, and a scheduled time-frequency resource.

In addition, the priori information may be a basic parameter used by the coordinating UE for coordination and sensing. The resource sensing window is just a resource window being periodically sensed by the coordinating UE. The start time of the resource sensing window may be determined in accordance with the specification of the $3^{rd}$ Generation Partnership Project (3GPP) R16.

In the embodiments of the present disclosure, in a process of determining the coordination resource, the resource sensing window may be "translated" to the resource indication window. The word "translate" may be understood as translation in a time domain, i.e., each of the start time and the end time of the resource sensing window is added with N slots, so that the resource sensing window after the translation is located within the resource indication window. To be specific, when determining the coordination resources, some resources in the resource indication window are excluded in accordance with a condition of the resources in the resource sensing window being sensed by the coordinating UE, the priori condition and the type of the coordination resource, so as to finally obtain the coordination resource.

The processes of determining the coordination resource in the above-mentioned two possible embodiments of the present disclosure will be described hereinafter in conjunction with specific circumstances.

First Circumstance: The type of the coordination resource is an unavailable time-domain resource.

The coordinating UE needs to indicate all of or a part of its own transmission slots in the resource indication window, or further indicate all of or a part of transmission slots of another UE in accordance with an sensing result in the resource sensing window, and the indicated resource is used as the coordination resource finally determined to be included in the sidelink resource coordination information.

Second Circumstance: The type of the coordination resource is an available time-frequency resource.

The coordinating UE needs to perform a resource exclusion process and a resource selection process specified in the 3GPP R16 in the resource indication window in accordance with the sensing result in the resource sensing window and a transmission parameter of the coordinated UE. Therefore, the coordinating UE indicates a resource selected after the procedure of resource exclusion and the resource selection as the coordination resource included in the sidelink resource coordination information, or indicates a remaining resource after the resource exclusion that meets a condition as the coordination resource included in the sidelink resource coordination information.

Third Circumstance: The type of the coordination resource is an unavailable time-frequency resource.

The coordinating UE indicates a resource/sub-channel with a too high priority value or a too high RSRP value in accordance with the sensing result in the resource sensing window as the coordination resource included in the sidelink resource coordination information.

Fourth Circumstance: The type of the coordination resource is a scheduled time-frequency resource (a resource for scheduling the coordinated UE to perform service transmission).

The coordinating UE needs to perform the resource exclusion process and the resource selection process specified in the 3GPP R16 in the resource indication window in accordance with the sensing result in the resource sensing window and the transmission parameter of the coordinated UE, and indicate a resource selected after the procedure of the resource exclusion and the resource selection as the coordination resource included in the sidelink resource coordination information.

Here, referring to FIG. 8, the following description will be given when the inter-UE coordination is triggered by the coordinating UE in the case that an inter-UE coordination triggering condition has been met by the coordinating UE and when a sidelink resource includes time-domain resource indication information.

As shown in FIG. 8, the preset inter-UE coordination triggering condition is met by the coordinating UE at a time point m1', and the coordinating UE needs to transmit a periodic service. The coordinating UE transmits coordination information in a preconfigured way, and transmits its own next transmission time point to the coordinated UE. The coordinating UE finds that it needs to perform next service transmission in slots 50, 54 and 55 after the time point m1', and indicates, in coordination information signaling, offset values (50, 54, 55) of these three time points with respect to the occasion when the triggering condition is met, an absolute time of the condition triggering time point m1', and a signaling type of the coordinating UE. Bits corresponding to the signaling type are "00", which represents "deprecated time-domain resource". Upon the reception of the information, the coordinated UE excludes the resources corresponding to slot m1'+50, slot m1'+54 and slot m1'+55 in accordance with the coordination information.

In a specific embodiment of the present disclosure, the determining the resource indication window for selecting the coordination resource includes: in the case that the inter-UE coordination triggering condition has been met or target resource selection window indication information for resource coordination in the received sidelink resource coordination request information includes only an end time of a target resource selection window, determining the resource indication information in accordance with a preset rule; or determining the resource indication window in accordance with a start time and the end time of the target resource selection window in the target resource selection window indication information for the resource coordination in the sidelink resource coordination request information received from the coordinated UE.

Figure 2:
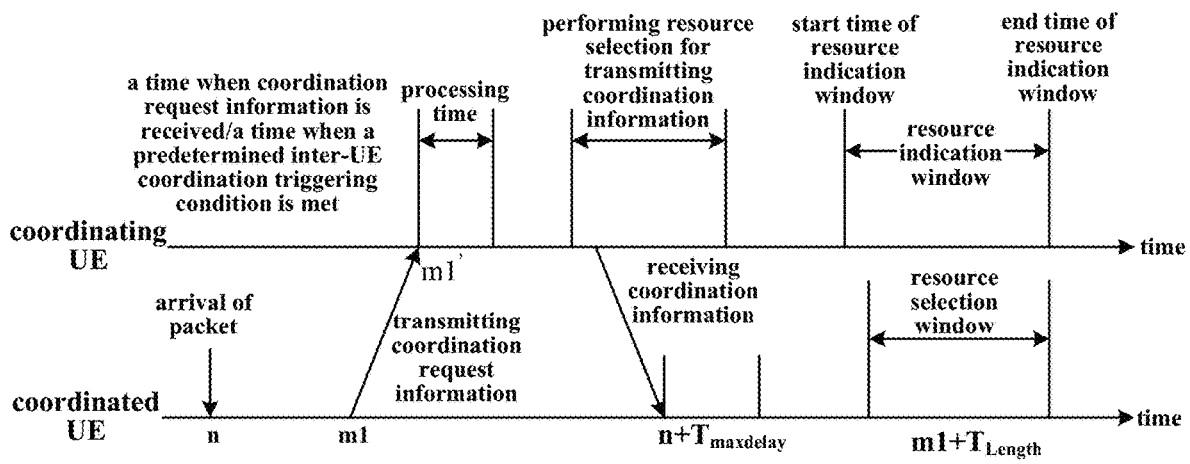
FIG. 2 is a schematic view showing the determination of a resource indication window according to an embodiment of the present disclosure.

In other words, in the embodiments of the present disclosure, the resource for selecting the coordination resource is determined in accordance with an event for triggering the inter-UE coordination. As shown in FIG. 2, there are specifically the following circumstances.

First circumstance: the inter-UE coordination is triggered when the preset inter-UE coordination triggering condition has been met by the coordinating UE, and the coordinating UE determines the start time and the end time of the resource indication window in accordance with the preset rule.

To be specific, the start time of the resource indication window may be any one of, or located after any one of: a first time m1' when the preset inter-UE coordination triggering condition has been met by the coordinating UE; a time corresponding to a sum of the first time and an eighth predetermined duration; a second time n' when the preset inter-UE coordination triggering condition has been processed by the coordinating UE; a third time when the sidelink resource coordination information is transmitted by the coordinating UE; a latest time when the sidelink resource coordination information is transmitted by the coordinating UE (as shown in FIG. 2, a time requirement must be met before the transmission of the coordination information, and when the coordination information is transmitted before a maximum delay (n'+T2') upon the reception of the coordination request information, the start time of the resource indication window is located after the time n'+T2'); a time corresponding to a sum of the latest time when the sidelink resource coordination information is transmitted by the coordinating UE and a third predetermined duration; or a start time of a resource selection window for selecting the resource to transmit, by the coordinating UE, the sidelink resource coordination information (as shown in FIG. 2, if a time when request signaling is received is m1', the start time of the resource selection window should not be smaller than a start time n'+T1' of the resource selection window for the next resource selection).

The end time of the resource indication window may not be earlier than a time point corresponding to a second predetermined duration after the determined start time of the resource indication window. In other words, an end time of the resource indication window is a time point corresponding a sum of the start time of the resource indication window and a fourth predetermined duration, or before the time point. The fourth predetermined duration may be configured by the higher layer or preconfigured.

Second circumstance: the inter-UE coordination is triggered when the sidelink resource coordination request information has been received by the coordinating UE, and the sidelink resource coordination request information includes only the end time of the target resource selection window.

To be specific, the start time of the resource indication window may be any one of, or after any one of: a fourth time m1' when the sidelink resource coordination request information has been received by the coordinating UE; a time corresponding to a sum of the fourth time and a fifth predetermined duration; a fifth time n' when the sidelink resource coordination request information has been processed by the coordinating UE; a start time of a resource selection window for selecting a resource for transmitting, by the coordinating UE, the sidelink resource coordination information (e.g., as shown in FIG. 2, if a time when request signaling is received is m1', a start time of the resource selection window should not be smaller than a start time n'+T1' of the resource selection window for the next resource selection); a third time when the sidelink resource coordination information is transmitted by the coordinating UE; a latest time when the sidelink resource coordination information is transmitted by the coordinating UE (as shown in FIG. 2, a time requirement must be met before the transmission of the coordination information, and when the coordination information is transmitted before a maximum delay (n'+T2') upon the reception of the coordination request information, the start time of the resource indication window is located after the time n'+T2').

The start time of the resource indication window may be any one of, or before any one of: a start time m2 of the target resource selection window in the sidelink resource coordination request information; a latest time when the sidelink resource coordination information has been received by the coordinated UE indicated in the sidelink resource coordination request information; a latest time when the sidelink resource coordination information is received minus a time corresponding to a sixth predetermined duration; or an end time of the target resource selection window in the sidelink resource coordination request information minus a seventh predetermined duration configured by the higher layer or preconfigured, or a minimum window length indicated in the sidelink resource coordination request information (as shown in FIG. 2, when information of the start time m2+$T_{length}$ of the target resource selection window and a minimum value $T_{Length}$ of a window length is carried in the coordination resource request information, a start time of the resource indication window shall not be later than the end time minus a window length, of the resource indication window.

Third circumstance: the inter-UE coordination is triggered when the sidelink resource coordination request information has been received by the coordinating UE, and the sidelink resource coordination request information includes the start time and the end time of the target resource selection window.

In this circumstance, the start time and the end time of the resource indication window may be determined in accordance with the start time and the end time of the target resource selection window in the sidelink resource coordination request information.

In a specific embodiment of the present disclosure, the type of the coordination resource may be determined in accordance with any one of a higher layer configuration or preconfiguration, coordination information type indication information in the received sidelink resource coordination request information, or the inter-UE coordination triggering condition.

In other words, in the case that the inter-UE coordination is triggered when the predetermined inter-UE coordination triggering condition has been met by the coordinating UE, i.e., in the case that the sidelink resource coordination information is issued by the coordinating UE on its own initiative to the coordinated UE, the type of the coordination resource is configured through higher layer signaling or preconfigured, or determined in accordance with the inter-UE coordination triggering condition. In the case that the inter-UE coordination is triggered when the sidelink resource coordination request information is received from the coordinated UE, on one hand, when the sidelink resource coordination request information includes a desired coordination resource type for the coordinated UE, i.e., the sidelink resource coordination request information includes the coordination information type indication information, the type of the coordination resource is determined in accordance with the coordination information type indication information. It should be noted that, in this case, the type of the coordination resource may also be determined by the coordinating UE in accordance with the higher layer configuration or preconfiguration. On the other hand, when the sidelink resource coordination request information does not include the coordination information type indication information, the type of the coordination resource may be determined in accordance with the higher layer configuration or preconfiguration.

Here, it should be appreciated that, the type of the coordination resource may be any one of an available time-frequency resource, an available time-domain resource, an unavailable time-frequency resource, an unavailable time-domain resource, or a scheduled time-frequency resource, i.e., a time-frequency resource for scheduling the coordinated UE to perform the service transmission.

In a specific embodiment of the present disclosure, the priori information for determining the coordination resource is obtained in accordance with any of a preconfiguration or higher layer configuration, sidelink resource coordination request information currently received, or service data being sensed from a coordinated UE.

In other words, in the case that the inter-UE coordination is triggered when the predetermined inter-UE coordination triggering condition has been met by the coordinating UE, i.e., in the case that the sidelink resource coordination information is issued by the coordinating UE on its own initiative to the coordinated UE, the priori information is configured through higher layer signaling or preconfigured, or determined in accordance with the sensed service data previously transmitted by the coordinated UE. In the case that the inter-UE coordination is triggered when the sidelink resource coordination request information is received from the coordinated UE, on one hand, when the sidelink resource coordination request information includes indication information corresponding to the priori information, e.g., indication information of a parameter of the coordinated UE for transmitting a packet or an RSRP threshold, the priori information is determined in accordance with the indication information corresponding to the priori information. It should be noted that, the priori information may also be determined in accordance with the higher layer configuration or preconfiguration. On the other hand, when the sidelink resource coordination request information does not include the indication information corresponding to the priori information, the priori information is determined in accordance with the higher layer configuration or preconfiguration.

In a specific embodiment of the present disclosure, the priori information includes at least one of the quantity of sub-channels for the coordination resource, a periodicity for the coordination resource, a counter value indicating consecutive occupation times of the coordination resource, a priority value of a target packet, retransmission times of the target packet, a configuration parameter of the RSRP threshold, and a priority value threshold of a packet.

Here, it should be appreciated that, the quantity of sub-channels for the coordination resource, the periodicity for the coordination resource, the counter value indicating the consecutive occupation times of the coordination resource, the priority value of the target packet and the retransmission times of the target packet are used to determine the available time-frequency resource in the resource sensing and exclusion process. The configuration parameter of the RSRP threshold and the priority value threshold of the packet are used to determine the unavailable time-frequency resource, and the unavailable time-frequency resource is indicated through a bitmap of slots and sub-channels. To be specific, the configuration parameter of the RSRP threshold is used to determine the unavailable time-frequency resource. The priority value threshold of the packet is used to determine that resources for a packet need to be excluded when a priority value of the packet is lower than the priority value threshold of the packet. Here, it should be appreciated that, the smaller the value of the priority, the priority value is higher, i.e., a priority value of 0 is a highest priority value.

In a specific embodiment of the present disclosure, the end time of the resource sensing window is any one of a time when the inter-UE coordination triggering condition has been met by the coordinating UE, or a time corresponding to a first predetermined duration in the received sidelink resource coordination request information before the start time of the target resource selection window for the resource coordination.

It should be appreciated that, when the inter-UE coordination is triggered when the inter-UE coordination triggering condition has been met by the coordinating UE, the end time of the resource sensing window is the time point when the inter-UE coordination triggering condition has been met by the coordinating UE, and when the inter-UE coordination is triggered when the sidelink resource coordination request information has been received, the end time of the resource sensing window is a time point corresponding to the first predetermined duration in the received sidelink resource coordination request information before the start time of the target resource selection window for the resource coordination.

In addition, it should be further appreciated that, the start time of the resource sensing window may be determined in accordance with the specification of 3GPP R16.

In a specific embodiment of the present disclosure, the sidelink resource coordination information includes any one of indication information of the available time-frequency resource, indication information of the available time-domain resource, indication information of the unavailable time-frequency resource, indication information of the unavailable time-domain resource, or indication information of the scheduled time-frequency resource.

It should be appreciated that, in the embodiments of the present disclosure, when the sidelink resource coordination information includes any of the above-mentioned information, the coordinated UE may perform the resource selection in the resource selection window in accordance with the indication information. For example, when the indication information indicates the unavailable resources, the coordinated UE may exclude these resources in the coordination information from the resource selection window during the resource selection.

Figure 3:
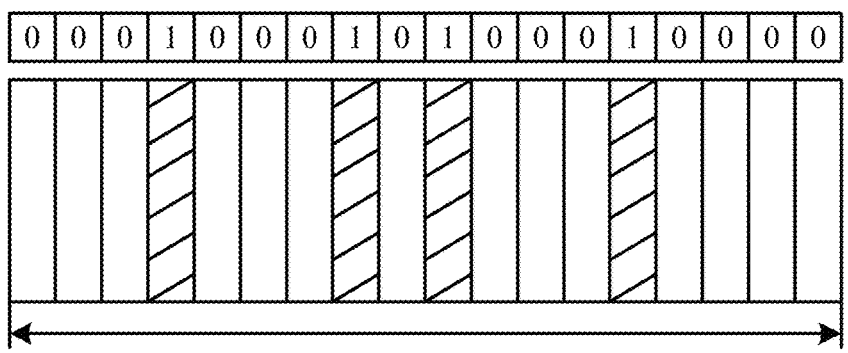
FIG. 3 is a schematic view showing a bitmap of slots in the resource indication window according to an embodiment of the present disclosure.

On one hand, when the indication information in the coordination information indicates a time-domain resource, the time-domain resource includes at least one of: an absolute time of the resource; a first offset time (an offset time of the absolute time of the resource relative to a transmission time of the coordination request information); a second offset time (an offset time of the absolute time of the resource relative to a first predetermined time indicated in the coordination request information); a third offset time (an offset time of the absolute time of the resource relative to a second predetermined time in the coordination request information); a slot bitmap (as shown in FIG. 3, available time-domain resources correspond to slots "1"); at least one of the start time and the end time of the resource indication window and the slot bitmap (i.e., apart from the slot bitmap, the time-domain resource further includes the start time and the end time of the resource indication window, and the start time and the end time of the resource indication window are expressed in any of the above-mentioned modes); a slot index (as shown in FIG. 4, slots with slot index numbers "5", "9" and "13" correspond to the indication information in the coordination information); or at least one of a start time and an end time of the resource indication window, and the slot index (i.e., apart from the slot index, the time-domain resource further includes the start time and the end time of the resource indication window, and the start time and the end time of the resource indication window may be expressed in any of the above-mentioned modes).

On the other hand, when the coordination information includes the time-frequency resource indication information, the time-frequency resource includes at least one of: a resource map (as shown in FIG. 5, a resource corresponding to "1" is an available resource, and the coordinated UE performs the resource selection in the resource selection window in accordance with the resource map; here, it should be appreciated that, a frequency-domain granularity may be a size of the resource or the quantity of sub-channels, and a time-domain granularity is slot); at least one of a start time and an end time of the resource indication window, and the resource map (i.e., apart from the resource map, the time-frequency resource further includes the start time and the end time of the resource indication window, and the start time and the end time of the resource indication window may be expressed in any of the above-mentioned modes); a time-frequency resource index number (as shown in FIG. 6, the time-frequency resource index number is an index number generated after ranking the resources in a certain order, each resource is provided with an index number, and resources with index numbers "12", "32", "58" and "87" may correspond to the time-frequency resource indication information; here, it should be appreciated that, for each index number, a frequency-domain granularity may be the quantity of sub-channels or a size of a resource block, and a time-domain granularity is slot); at least one of the start time of the resource indication window, the end time of the resource indication window, a length of a row of the resource indication window or a length of a column of the resource indication window, and the time-frequency resource index number (i.e., apart from the time-frequency resource index number, the time-frequency resource further includes at least one of the start time, the end time, the length of the row and the length of the column of the resource indication window, and the start time and the end time of the resource indication window are expressed in any of the above-mentioned modes); a time-domain-frequency-domain two-dimensional coordinate pair (as shown in FIG. 7, a resource indicated by a slashed box corresponds to the time-frequency resource indication information; here, it should be appreciated that, a granularity of frequency-domain coordinates is the quantity of sub-channels or a size of a resource block, and a granularity of time-domain coordinates is slot); or at least one of the start time of the resource indication window, the end time of the resource indication window, the length of the row of the resource indication window and the length of the column of the resource indication window, and the time-domain-frequency-domain two-dimensional coordinate pair (i.e., apart from the time-domain-frequency-domain two-dimensional coordinate pair, the time-frequency resource further includes at least one of the start time, the end time, the length of the row and the length of the column of the resource indication window, and the start time and the end time of the resource indication window may be expressed in any of the above-mentioned modes).

The resource selection and determination between the UEs will be described hereinafter in conjunction with FIGS. 8 and 9.

The coordinated UE transmits the coordination request information, which includes the end time of the target resource selection window, the quantity of sub-channels for the resource, the minimum window length and the type of the coordination resource "recommended time-frequency resource". Upon the reception of the coordination request signaling, the coordinating UE needs to determine the resource indication window. The end time of the resource indication window is obtained in accordance with the coordination request information, and it is the same as the end time of the target resource selection window. The start time of the resource indication window needs to be located before the end time, i.e., the minimum window length, and located after a latest transmission time n'+T2' (as shown in FIG. 2) of the coordination information when the resource selection for transmitting the coordination information is performed after n' (as shown in FIG. 2). When these conditions have been met, the UE may determine the start time of the window on its own. After determining the start time and the end time of the window, the coordinating UE performs the resource exclusion in the window in accordance with its own sensing result, indicates remaining resources (resource granularities) with the index numbers 22, 23, 24, . . . , 71, 78 and 84 (as shown in FIG. 9) into the coordination information, and indicates its own service priority value and the quantity of the increases of the RSRP thresholds into the coordination information signaling. The coordinated UE determines the quantity of frequency-domain rows of a resource table in accordance with the quantity of sub-channels for the resources and the distribution of the sub-channels, and determines a position of a start point for the index numbers in accordance with the end time of the resource window. The coordinated UE may know resource positions indicated through all the index numbers carried in the coordination information, and then performs the subsequent resource selection in accordance with the information.

In a possible embodiment of the present disclosure, the sidelink resource coordination information further includes at least one of an indication field for a coordination resource type, identification information of one or more target coordinated UEs, an RSRP threshold parameter, priority values of at least a part of service data packets in a plurality of to-be-transmitted service data packets, the quantity of sub-channels for each resource, an indication field for a scheduling information type, a periodicity of a service for the coordinating UE, a counter value indicating the quantity of consecutive resource occupation times of the service for the coordinating UE, or the quantity of retransmission times of a target packet.

The above contents in the sidelink resource coordination information and the effects thereof will be described hereinafter.

The indication field for the coordination resource type is used to indicate whether the transmitted coordination information is a recommended resource or a deprecated resource, or whether the transmitted coordination information is a recommended time-domain resource or a recommended time-frequency resource. In other words, the indication field for the coordination resource type indicates an available time-domain resource, an unavailable time-domain resource, an available time-frequency resource, or an unavailable time-frequency resource.

The identification information of the one or more target coordinated UEs is used to indicate an Identity (ID) of the coordinated UE which needs to receive the sidelink resource coordination information. Upon the reception of the sidelink resource coordination information, another UE needs to determine whether its own ID is consistent with the ID of the coordinated UE, so as to determine whether it is a valid coordinated UE. When the UE is the valid coordinated UE, it decodes and uses the coordination information.

The RSRP threshold parameter is used to adjust the RSRP threshold when the coordinating UE performs the resource exclusion. The RSRP threshold parameter is used to notify the coordinated UE of the resource exclusion process for determining, by the coordinating UE, the coordination information, so that the coordinated UE determines whether to adopt the coordination information. To be specific, the RSRP threshold parameter is an adjusted RSRP threshold, or the quantity of adjustment times of the RSRP threshold.

The priority values of at least a part of service data packets in the plurality of to-be-transmitted service data packets may be used to notify the coordinated UE of an order of processing, by the coordinating UE, the service data packets.

The coordinated UE determines the sub-channel corresponding to each coordination resource in the sidelink resource coordination information in accordance with the quantity of sub-channels for each resource.

The indication field for the type of the scheduling information is used to indicate that the sidelink resource coordination information is coordination information to be adopted by the coordinated UE as suggested or forced by the coordinating UE.

The coordinated UE determines slots in which the service data packet is to be transmitted by the coordinating UE in accordance with at least one of periodicity of the service for the coordinating UE, the counter value indicating the consecutive resource occupation times of the service for the coordinating UE and the quantity of retransmission times of the target packet, and then exclude these slots during the resource selection, so as to prevent the coordinating UE from decoding the information incorrectly due to half duplex.

In a possible embodiment of the present disclosure, the priority value of the sidelink resource coordination information is any one of: a priority value of a packet to be transmitted by the coordinated UE; a priority value configured through higher layer signaling or a preconfigured priority value; a predetermined priority value, i.e., a large one of a first difference and 0 (the first difference is a difference between the priority value of the to-be-transmitted packet and a preset value, and the preset value is configured through higher layer signaling); or a priority value of the sidelink resource coordination request information.

It should be appreciated that, depending on a current design of $1^{st}$-stage Sidelink Control Information (SCI), 3 bits in the $1^{st}$-stage SCI are used to indicate priority information. The priority information may be considered as priority information of the sidelink resource coordination information. The priority information in the $1^{st}$-stage SCI is indicated in accordance with one of the priority value of the to-be-transmitted packet in the sidelink resource coordination request information, a priority value configured by the higher layer, a preconfigured priority value, a preset priority value or coordination request information.

To be specific, the priority value of the packet to be transmitted by the coordinated UE is a priority value of a to-be-transmitted packet which has currently arrived at a physical layer of the coordinated UE, i.e., a priority value of the packet to be transmitted through a resource requested by the coordinated UE to the coordinating UE. The priority value configured by the higher layer is a priority value of the coordination information issued by the higher layer and received by a physical layer of the coordinating UE. The preset priority value is a priority value determined through comparing a first difference between the to-be-transmitted packet and a preset value configured through higher layer signaling with 0. It should be appreciated that, in the embodiments of the present disclosure, 0 represents a highest priority value, and through comparing the first difference with 0, it is able to prevent the occurrence of such a situation where a predetermined rule is not satisfied, e.g., a situation where the first difference is a negative number. In other words, the preset priority value is a preset value to ensure that the priority value of the coordination information is higher than the priority value of the packet to be transmitted by the coordinated UE.

In a possible embodiment of the present disclosure, the sidelink resource coordination information is carried in any one of $2^{nd}$-stage SCI, Radio Resource Control (RRC) signaling, or a Media Access Control Control Element (MAC CE).

In other words, in the embodiments of the present disclosure, the sidelink resource coordination information is transmitted on the $2^{nd}$-stage SCI, RRC signaling or MAC CE.

In a possible embodiment of the present disclosure, in the case that the sidelink resource coordination information is carried on the $2^{nd}$-stage SCI, bits "10" or "11" in the $1^{st}$-stage SCI are used to indicate a format of the $2^{nd}$-stage SCI.

To be specific, 2-bit information in the $1^{st}$-stage SCI may be used to indicate the format of the $2^{nd}$-stage SCI. Currently, "00" and "01" are used to indicate the known SCI format-A and SCI format-B respectively. Hence, in the embodiments of the present disclosure, a new $2^{nd}$-stage SCI format is defined to transmit the coordination information. Depending on the current design of the $1^{st}$-stage SCI, two bits are used to indicate the formation of the $2^{nd}$-stage SCI, so "10" or "11" is used to indicate the new $2^{nd}$-stage SCI format for carrying the coordination information.

In a possible embodiment of the present disclosure, in Step 102, the transmitting the sidelink resource coordination information includes transmitting the sidelink resource coordination information within a second predetermined duration after receiving the sidelink resource coordination request information. The second predetermined duration is configured through higher layer signaling or preconfigured, or determined in accordance with a latest time indicated in the sidelink resource coordination request information for receiving the sidelink resource coordination information, or determined in accordance with a start time of a resource indication window for selecting the coordination resource.

In the embodiments of the present disclosure, a time for transmitting the sidelink resource coordination information is limited, so as to ensure the timeliness of the resource in the coordination information. The coordination information may not be transmitted too late; otherwise a time when the coordination information is received may exceed a time for the resource indicated in the coordination information, and thereby fewer active resources are indicated in the coordination information or the valid resource becomes invalid. For example, when the coordinating UE has received the sidelink resource coordination request information at m1' or a preset condition has been triggered by the coordinating UE to transmit the coordination information, the coordination information signaling needs to be transmitted before m1'+T, where T represents a maximum delay for transmitting the coordination information signaling.

As shown in FIG. 10, the coordinated UE transmits the sidelink resource coordination request information at m 1. After the coordinating UE has received the sidelink resource coordination request information at m1', it prepares content of the coordination information signaling, and a latest reception time of the coordination information for the coordinated UE in the coordination request information is m1+20 slots. The coordinating UE needs to select a resource for transmitting the coordination information within 20 slots after m1. The coordinating UE transmits the coordination information at m1+16 slots, and the coordinated UE perform the resource exclusion upon the reception of the information.

The interaction for the resource selection between the coordinating UE and the coordinated UE will be described hereinafter in conjunction with specific embodiments.

First Embodiment (A) The coordinating UE receives the coordination request information from the coordinated UE, and the coordination request information includes basic parameters for coordination and sensing, e.g., a size of a frequency-domain resource (the quantity of sub-channels) in the resource coordination, a target service priority value in the resource coordination, target retransmission times in the resource coordination, a start time and an end time of the resource selection window, and an indicator for requesting an available time-frequency resource.

(B) The coordinating UE determines the basic parameters for coordination and sensing and the content thereof (the available time-frequency resource) in accordance with the coordination request information, and determines an indication window in accordance with the content of the coordination request information. When the time when the coordination request information is received is the end time of the resource sensing window, the start time of the resource sensing window is configured in accordance with 3GPP R16, the resource exclusion process is performed in the resource indication window, and the remaining resources that are after the resource exclusion process and meet the priority value are recorded and indicated into the coordination information in the form of resource index.

The signaling includes an index number of each indicated resource, and an ID of the coordinated UE.

(C) A latest time for transmitting, by the coordinating UE, the coordination information is 10 slots before a start time of the resource indication window. The coordination information is carried on RRC signaling when it is transmitted before the time.

Second Embodiment (A) The coordinating UE is a multicasting source for transmitting information in a multicast manner. Then the quantity of reception times of Non-Acknowledgement (NACK) exceeds the preconfigured quantity of times, a coordination process is triggered and the coordinating UE transmits the coordination information for a retransmitted multicast service. At first, the coordinating UE determines the basic parameters for coordination and sensing. A size of the frequency-domain resource (the quantity of sub-channels) in the resource coordination is a size of a resource for the multicast service. A target service priority value in the resource coordination is a multicast service priority value. The type of the coordination resource is an available time-frequency resource in accordance with the triggering condition. The coordinating UE determines by itself the start time and the end time of the resource indication window, the start time is a time when the coordination is triggered+20 slots, and the end time is a start time+100 slots. The end time of the resource sensing window is the start time of the resource indication window−10 slots, and the start time is determined in accordance with 3GPP R16.

(B) The coordinating UE performs sensing in the sensing window, performs the resource exclusion process and the resource selection process in the resource indication window in accordance with the multicast service priority value, records the selected time-frequency resources, and indicates the time-frequency resources in the form of bitmap.

(C) The signaling transmitted by the coordinating UE includes the size of the frequency-domain resource (the quantity of sub-channels) in the resource coordination (i.e., the size of the resource for the multicast service), the target service priority value in the resource coordination (i.e., the multicast service priority value), the type of the coordination resource (i.e., the available time domain-frequency domain resource), the start time and the end time of the resource indication window, and the resource indicated in the resource indication window.

(D) A latest time for transmitting, by the coordinating UE, the coordination information is 10 slots before the start time of the resource indication window. The coordinating information is transmitted before the time, and the coordination signaling is carried on the $2^{nd}$-stage SCI.

Third Embodiment (A) The coordinated UE transmits the sidelink coordination request information, and the coordinating UE parses coordination sensing parameters from the coordination request information, a size of the frequency-domain resource (the quantity of sub-channels) in the resource coordination, a target service priority value in the resource coordination, an RSRP threshold, the type of the coordination resource in the coordination request information (i.e., unavailable time-frequency resource), the end time of the resource indication window in the coordination request information, and a latest transmission time for transmitting the coordination information in the coordination request information.

(B) The coordinating UE needs to determine the end time of the resource sensing window and the start time of the resource indication window. The coordinating UE determines the resource sensing window and the resource indication window with a time when the coordination request information is received by the coordinating UE as the end time of the resource sensing window, and with the latest transmission time of the coordination time+5 slots as the start time of the resource sensing window.

(C) The coordinating UE performs the sensing in the resource sensing window, performs the resource exclusion process in the resource indication window, determines a resource exclusion proportion in accordance with the service priority value, records the resources whose measured RSRP values exceeds the RSRP threshold, indicates the resources in the form of two-dimensional coordinates, and indicate the two-dimensional coordinates for indication into the coordination information.

The coordination information includes the start time of the resource indication window, and the two-dimensional coordinates of the unavailable resources in all the resource indication windows.

Fourth Embodiment (A) The coordinated UE transmits the sidelink resource coordination request information.

(B) The coordinating UE determines that the type of the coordination resource in the coordination request information is an unavailable time-domain resource, and the coordination request information includes the start time and the end time of the resource indication window.

(C) The coordinating UE indicates its transmission slots in the resource indication window into the coordination information in the form of bitmap, and the signaling includes the bitmap of the indicated slots.

Figure 11:
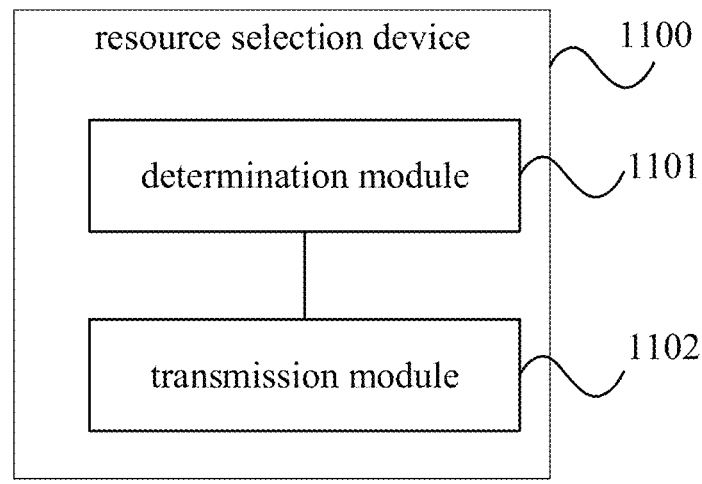
FIG. 11 is a schematic view showing a resource selection device according to an embodiment of the present disclosure.

As shown in FIG. 11, the present disclosure further provides in some embodiments a resource selection device for a coordinating UE in a V2X sidelink system, which includes: a determination module 1101 configured to determine content of sidelink resource coordination information; and a transmission module 1102 configured to transmit the sidelink resource coordination information.

In the resource selection device of the embodiment of the present disclosure, the determination module 801 includes: a first determination sub-module configured to determine a resource indication window for selecting a coordination resource; a second determination sub-module configured to determine a type of the coordination resource; and a third determination sub-module configured to determine a coordination resource included in the sidelink resource coordination information in the resource indication window in accordance with the type of the coordination resource.

In the resource selection device of the embodiment of the present disclosure, the determination module 1101 includes: a first determination sub-module configured to determine a resource indication window for selecting a coordination resource; a second determination sub-module configured to determine a type of the coordination resource; an obtaining sub-module configured to obtain priori information for determining the coordination resource; a third determination sub-module configured to determine an end time of a resource sensing window; and a fourth determination sub-module configured to determine a coordination resource included in the sidelink resource coordination information in the resource indication window in accordance with the priori information, the type of the coordination resource and the resource sensing window.

In the resource selection device of the embodiment of the present disclosure, the first determination sub-module is specifically configured to: determine the resource indication window in accordance with a preset rule after the coordinating UE has met an inter-UE coordination triggering condition, or in the case that target resource selection window indication information for resource coordination in received sidelink resource coordination request information includes only an end time of a target resource selection window; or determine the resource indication window in accordance with a start time and the end time of the target resource selection window in the target resource selection window indication information for the resource coordination in the sidelink resource coordination request information received from a coordinated UE.

In the resource selection device of the embodiment of the present disclosure, the second determination sub-module is specifically configured to determine the type of the coordination resource in accordance with any one of a configuration by a higher layer or a preconfiguration, coordination information type indication information in the received sidelink resource coordination request information, or the inter-UE coordination triggering condition.

In the resource selection device of the embodiment of the present disclosure, the obtaining sub-module is specifically configured to obtain the priori information for determining the coordination resource in accordance with any one of a configuration by a higher layer or a preconfiguration, sidelink resource coordination request information currently received, or sensed service data transmitted by the coordinated UE.

In the resource selection device of the embodiment of the present disclosure, the priori information includes at least one of the quantity of sub-channels for the coordination resource, a periodicity for the coordination resource, a counter value indicating consecutive occupation times of the coordination resource, a priority of a target packet, the quantity of retransmission times of the target packet, a configuration parameter of an RSRP value, or a priority value threshold of a packet.

In the resource selection device of the embodiment of the present disclosure, the end time of the resource sensing window is any one of a time when the coordinating UE meets the inter-UE coordination triggering condition, or a time corresponding a first predetermined duration before a start time of a target resource selection time for resource coordination in the received sidelink resource coordination request information.

In the resource selection device of the embodiment of the present disclosure, the sidelink resource coordination information includes any one of indication information indicating an available time-frequency resource, indication information indicating an available time-domain resource, indication information indicating an unavailable time-frequency resource, indication information indicating an unavailable time-domain resource, and indication information indicating a scheduled time-frequency resource.

In the resource selection device of the embodiment of the present disclosure, the sidelink resource coordination information further includes at least one of an indication field for the type of the coordination resource, identification information of one or more target coordinated UEs, a parameter of an RSRP threshold, priority values of at least a part of service data packets in a plurality of to-be-transmitted service data packets, the quantity of sub-channels for each resource, an indication field for a type of scheduling information, a periodicity of a service for the coordinating UE, a counter value indicating consecutive resource occupation times of a service for the coordinating UE, and the quantity of retransmission times of a target packet.

In the resource selection device of the embodiment of the present disclosure, the priority value of the sidelink resource coordination information is any one of: a priority value of a packet to be transmitted by the coordinated UE; a priority value configured through higher layer signaling or a pre-configured priority value; a predetermined priority value, the predetermined priority value being a larger one of a first difference and 0, the first difference being a difference between a priority value of a to-be-transmitted service data packet and a preset value, the preset value being configured through higher layer signaling; or a priority value of the sidelink resource coordination request information.

In the resource selection device of the embodiment of the present disclosure, the sidelink resource coordination information is carried on any one of $2^{nd}$-stage SCI, RRC signaling, or an MAC CE.

In the case that the sidelink resource coordination information is carried on the $2^{nd}$-stage SCI, bits "10" or "11" in $1^{st}$-stage SCI are used to indicate a format of the $2^{nd}$-stage SCI.

In the resource selection device of the embodiment of the present disclosure, the transmission module 802 is specifically configured to transmit the sidelink resource coordination information in a second predetermined duration after receiving the sidelink resource coordination request information, and the second predetermined duration is determined in accordance with a configuration by a higher layer or a preconfiguration, a latest time for receiving the sidelink resource coordination information indicated in the sidelink resource coordination request information, or a start time of a resource indication window for selecting the coordination resource.

In the resource selection device of the embodiment of the present disclosure, the resource selection device 1100 in the embodiments of the present disclosure corresponds to the above-mentioned method, and the implementation of the resource selection device may refer to that of the method with a same technical effect, which will not be further particularly defined herein.

Figure 12:
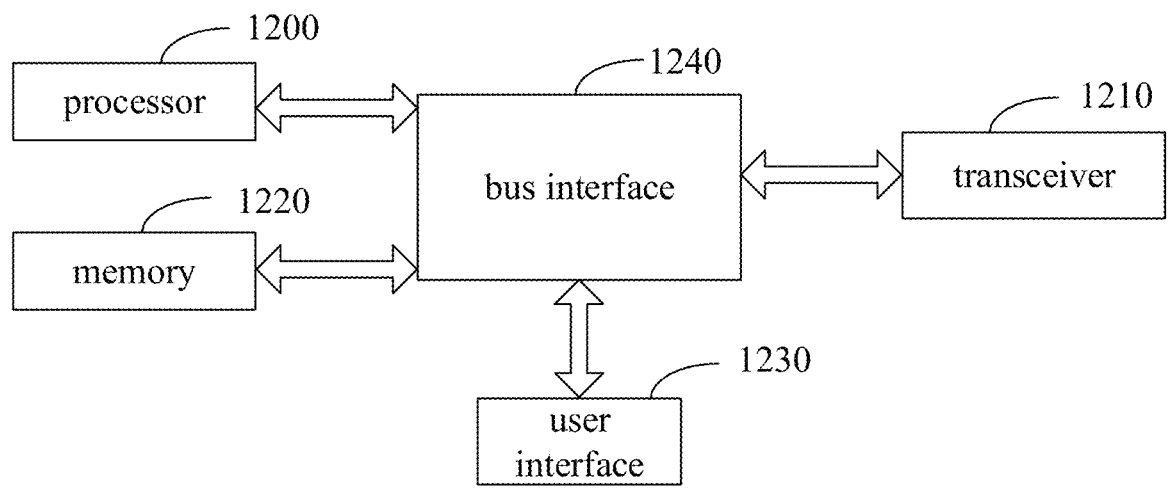
FIG. 12 is a schematic view showing a terminal device according to an embodiment of the present disclosure.

As shown in FIG. 12, the present disclosure further provides in some embodiments an electronic device, which includes a processor 1200, and a memory 1220 in communication with the processor 1200 via a bus interface. The memory 1220 is configured to store therein programs and data for the operation of the processor 1200. The processor 1200 is configured to call and execute the programs and data in the memory 1220.

A transceiver 1210 is coupled to the bus interface, and configured to receive and transmit data under the control of the processor 1200. The processor 1200 is configured to read the programs in the memory 1220 so as to: determine content of sidelink resource coordination information; and transmit, through the transceiver 1210, the sidelink resource coordination information.

In FIG. 12, bus architecture may include a number of buses and bridges connected to each other, so as to connect various circuits for one or more processors 1200 and one or more memories 1220. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 1210 may consist of a plurality of elements, i.e., a transmitter and a receiver for communication with any other devices over a transmission medium. With respect to different UEs, a user interface 1230 may also be provided for devices which are to be arranged inside or outside the UE, and these devices may include but not limited to a keypad, a display, a speaker, a microphone and a joystick. The processor 1200 may take charge of managing the bus architecture as well as general processings. The memory 1220 may store therein data for the operation of the processor 1200.

In a possible embodiment of the present disclosure, when determining the content of the sidelink resource coordination information, the processor 1200 is specifically configured to: determine a resource indication window for selecting a coordination resource; determine a type of the coordination resource; and determine a coordination resource included in the sidelink resource coordination information in the resource indication window in accordance with the type of the coordination resource.

In a possible embodiment of the present disclosure, when determining the content of the sidelink resource coordination information, the processor 1200 is specifically configured to: determine a resource indication window for selecting a coordination resource; determine a type of the coordination resource; obtain priori information for determining the coordination resource; determine an end time of a resource sensing window; and determine a coordination resource included in the sidelink resource coordination information in the resource indication window in accordance with the priori information, the type of the coordination resource and the resource sensing window.

In a possible embodiment of the present disclosure, when determining the resource indication window for selecting the coordination resource, the processor 1200 is specifically configured to: determine the resource indication window in accordance with a preset rule after the coordinating UE has met an inter-UE coordination triggering condition, or in the case that target resource selection window indication information for resource coordination in received sidelink resource coordination request information includes only an end time of a target resource selection window; or determine the resource indication window in accordance with a start time and the end time of the target resource selection window in the target resource selection window indication information for the resource coordination in the sidelink resource coordination request information received from a coordinated UE.

In a possible embodiment of the present disclosure, the processor 1200 is specifically configured to determine the type of the coordination resource in accordance with any one of a configuration by a higher layer or a preconfiguration, coordination information type indication information in the received sidelink resource coordination request information, or the inter-UE coordination triggering condition.

In a possible embodiment of the present disclosure, the processor 1200 is specifically configured to determine the priori information for determining the coordination resource in accordance with any one of a configuration by a higher layer or a preconfiguration, sidelink resource coordination request information currently received, or sensed service data transmitted by the coordinated UE.

In a possible embodiment of the present disclosure, the priori information determined by the processor 1200 includes at least one of the quantity of sub-channels for the coordination resource, a periodicity for the coordination resource, a counter value indicating consecutive occupation times of the coordination resource, a priority of a target packet, the quantity of retransmission times of the target packet, a configuration parameter of an RSRP value, or a priority value threshold of a packet.

In a possible embodiment of the present disclosure, the end time of the resource sensing window determined by the processor 1200 is any one of a time when the coordinating UE meets the inter-UE coordination triggering condition, or a time corresponding a first predetermined duration before a start time of a target resource selection time for resource coordination in the received sidelink resource coordination request information.

In a possible embodiment of the present disclosure, the sidelink resource coordination information determined by the processor 1200 includes any one of indication information indicating an available time-frequency resource, indication information indicating an available time-domain resource, indication information indicating an unavailable time-frequency resource, indication information indicating an unavailable time-domain resource, and indication information indicating a scheduled time-frequency resource.

In a possible embodiment of the present disclosure, the sidelink resource coordination information determined by the processor 1200 further includes at least one of an indication field for the type of the coordination resource, identification information of one or more target coordinated UEs, a parameter of an RSRP threshold, priority values of at least a part of service data packets in a plurality of to-be-transmitted service data packets, the quantity of sub-channels for each resource, an indication field for a type of scheduling information, a periodicity of a service for the coordinating UE, a counter value indicating consecutive resource occupation times of a service for the coordinating UE, and the quantity of retransmission times of a target packet.

In a possible embodiment of the present disclosure, the priority value of the sidelink resource coordination information determined by the processor 1200 is any one of: a priority value of a packet to be transmitted by the coordinated UE; a priority value configured through higher layer signaling or a preconfigured priority value; a predetermined priority value, the predetermined priority value being a larger one of a first difference and 0, the first difference being a difference between a priority value of a to-be-transmitted service data packet and a preset value, the preset value being configured through higher layer signaling; or a priority value of the sidelink resource coordination request information.

In a possible embodiment of the present disclosure, the sidelink resource coordination information transmitted through the transceiver 1210 is carried on any one of $2^{nd}$-stage SCI, RRC signaling, or an MAC CE.

In a possible embodiment of the present disclosure, in the case that the sidelink resource coordination information transmitted through the transceiver 1210 is carried on the $2^{nd}$-stage SCI, bits "10" or "11" in $1^{st}$-stage SCI are used to indicate a format of the $2^{nd}$-stage SCI.

In a possible embodiment of the present disclosure, when transmitting the sidelink resource coordination information, the transceiver 1210 is specifically configured to transmit the sidelink resource coordination information in a second predetermined duration after receiving the sidelink resource coordination request information, and the second predetermined duration is determined in accordance with a configuration by a higher layer or a preconfiguration, a latest time for receiving the sidelink resource coordination information indicated in the sidelink resource coordination request information, or a start time of a resource indication window for selecting the coordination resource.

The electronic device in the embodiments of the present disclosure correspond to the above-mentioned method, and the implementation of the electronic device may refer to that of the method with a same technical effect.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form. In other words, the present disclosure further provides in some embodiments a computer-readable storage medium storing therein a computer program, and the computer program is executed by a processor so as to implement the above-mentioned resource selection method.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. It should be noted that, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Some steps may also be performed in parallel, or independent of each other.

The above are preferred embodiments of the present disclosure. It should be noted that a person skilled in the art may make further modifications and improvements without departing from the principle of the present disclosure, and these modifications and improvements shall also fall within the scope of the present disclosure.

What is claimed is:

1. A resource selection method for a coordinating User Equipment (UE) in a Vehicle to Everything (V2X) sidelink system, comprising:
   determining content of sidelink resource coordination information;
   transmitting the sidelink resource coordination information;
   wherein the determining the content of the sidelink resource coordination information comprises:
   determining a resource indication window for selecting a coordination resource;
   determining a type of the coordination resource;
   determining a coordination resource comprised in the sidelink resource coordination information in the resource indication window in accordance with the type of the coordination resource;
   wherein the determining the resource indication window for selecting the coordination resource comprises:
   determining the resource indication window in accordance with a preset rule after the coordinating UE has met an inter-UE coordination triggering condition, or in the case that target resource selection window indication information for resource coordination in received sidelink resource coordination request information comprises only an end time of a target resource selection window; or
   determining the resource indication window in accordance with a start time and the end time of the target resource selection window in the target resource selection window indication information for the resource coordination in the sidelink resource coordination request information received from a coordinated UE.

2. A resource selection method for a coordinating User Equipment (UE) in a Vehicle to Everything (V2X) sidelink system, comprising:
   determining content of sidelink resource coordination information;
   transmitting the sidelink resource coordination information;
   wherein the determining the content of the sidelink resource coordination information comprises:

determining a resource indication window for selecting a coordination resource;
determining a type of the coordination resource;
obtaining priori information for determining the coordination resource;
determining an end time of a resource sensing window;
determining a coordination resource comprised in the sidelink resource coordination information in the resource indication window in accordance with the priori information, the type of the coordination resource and the resource sensing window;
wherein the determining the resource indication window for selecting the coordination resource comprises:
determining the resource indication window in accordance with a preset rule after the coordinating UE has met an inter-UE coordination triggering condition, or in the case that target resource selection window indication information for resource coordination in received sidelink resource coordination request information comprises only an end time of a target resource selection window; or
determining the resource indication window in accordance with a start time and the end time of the target resource selection window in the target resource selection window indication information for the resource coordination in the sidelink resource coordination request information received from a coordinated UE.

3. The resource selection method according to claim 1, wherein the type of the coordination resource is determined in accordance with any one of:
a configuration by a higher layer or a preconfiguration;
coordination information type indication information in the received sidelink resource coordination request information;
the inter-UE coordination triggering condition.

4. The resource selection method according to claim 2, wherein the priori information for determining the coordination resource is obtained in accordance with any one of:
a configuration by a higher layer or a preconfiguration;
sidelink resource coordination request information currently received;
sensed service data transmitted by the coordinated UE.

5. The resource selection method according to claim 2, wherein the priori information comprises at least one of:
a quantity of sub-channels for the coordination resource;
a periodicity for the coordination resource;
a counter value indicating consecutive occupation times of the coordination resource;
a priority of a target packet;
a quantity of retransmission times of the target packet;
a configuration parameter of a Reference Signal Receiving Power (RSPR) threshold;
a priority value threshold of a packet.

6. The resource selection method according to claim 2, wherein the end time of the resource sensing window is any one of:
a time when the coordinating UE meets an inter-UE coordination triggering condition;
a time corresponding a first predetermined duration before a start time of a target resource selection time for resource coordination in the received sidelink resource coordination request information.

7. The resource selection method according to claim 1, wherein the sidelink resource coordination information comprises any one of:
indication information indicating an available time-frequency resource,
indication information indicating an available time-domain resource;
indication information indicating an unavailable time-frequency resource;
indication information indicating an unavailable time-domain resource;
indication information indicating a scheduled time-frequency resource.

8. The resource selection method according to claim 7, wherein the sidelink resource coordination information further comprises at least one of:
an indication field for the type of the coordination resource;
identification information of one or more target coordinated UEs;
a parameter of an RSRP threshold;
priority values of at least a part of service data packets in a plurality of to-be-transmitted service data packets;
the quantity of sub-channels for each resource;
an indication field for a type of scheduling information;
a periodicity of a service for the coordinating UE;
a counter value indicating consecutive resource occupation times of a service for the coordinating UE;
the quantity of retransmission times of a target packet.

9. The resource selection method according to claim 1, wherein a priority value of the sidelink resource coordination information is any one of:
a priority value of a packet to be transmitted by the coordinated UE;
a priority value configured by a higher layer or a preconfigured priority value;
a predetermined priority value, the predetermined priority value being a larger one of a first difference and 0, the first difference being a difference between a priority value of a to-be-transmitted service data packet and a preset value, and the preset value being configured by the higher layer;
a priority value of the sidelink resource coordination request information.

10. The resource selection method according to claim 1, wherein the sidelink resource coordination information is carried on any one of:
$2^{nd}$-stage Sidelink Control Information (SCI);
Radio Resource Control (RRC) signaling;
a Media Access Control Control Element (MAC CE).

11. The resource selection method according to claim 1, wherein the transmitting the sidelink resource coordination information comprises:
transmitting the sidelink resource coordination information in a second predetermined duration after receiving the sidelink resource coordination request information, and the second predetermined duration is determined in accordance with any one of:
a higher layer configuration or a preconfiguration;
a latest time for receiving the sidelink resource coordination information indicated in the sidelink resource coordination request information;
a start time of a resource indication window for selecting the coordination resource.

12. A terminal device, comprising: a transceiver, a memory, a processor, and a computer program stored in the memory and configured to be executed by the processor, wherein the processor is configured to execute the computer program to implement a resource selection method comprising:
determining content of sidelink resource coordination information;

transmitting the sidelink resource coordination information;

wherein the determining the content of the sidelink resource coordination information comprises:

determining a resource indication window for selecting a coordination resource;

determining a type of the coordination resource;

determining a coordination resource comprised in the sidelink resource coordination information in the resource indication window in accordance with the type of the coordination resource;

or, wherein the determining the content of the sidelink resource coordination information comprises:

determining a resource indication window for selecting a coordination resource;

determining a type of the coordination resource;

obtaining priori information for determining the coordination resource;

determining an end time of a resource sensing window;

determining a coordination resource comprised in the sidelink resource coordination information in the resource indication window in accordance with the priori information, the type of the coordination resource and the resource sensing window;

wherein the determining the resource indication window for selecting the coordination resource comprises:

determining the resource indication window in accordance with a preset rule after the coordinating UE has met an inter-UE coordination triggering condition, or in the case that target resource selection window indication information for resource coordination in received sidelink resource coordination request information comprises only an end time of a target resource selection window; or determining the resource indication window in accordance with a start time and the end time of the target resource selection window in the target resource selection window indication information for the resource coordination in the sidelink resource coordination request information received from a coordinated UE.

13. The resource selection method according to claim 2, wherein the type of the coordination resource is determined in accordance with any one of:

a configuration by a higher layer or a preconfiguration;

coordination information type indication information in the received sidelink resource coordination request information;

the inter-UE coordination triggering condition.

14. The terminal device according to claim 12, wherein the type of the coordination resource is determined in accordance with any one of:

a configuration by a higher layer or a preconfiguration;

coordination information type indication information in the received sidelink resource coordination request information;

the inter-UE coordination triggering condition.

15. The resource selection method according to claim 2, wherein the sidelink resource coordination information comprises any one of:

indication information indicating an available time-frequency resource, indication information indicating an available time-domain resource;

indication information indicating an unavailable time-frequency resource;

indication information indicating an unavailable time-domain resource;

indication information indicating a scheduled time-frequency resource.

16. The resource selection method according to claim 15, wherein the sidelink resource coordination information further comprises at least one of:

an indication field for the type of the coordination resource;

identification information of one or more target coordinated UEs;

a parameter of an RSRP threshold;

priority values of at least a part of service data packets in a plurality of to-be-transmitted service data packets;

the quantity of sub-channels for each resource;

an indication field for a type of scheduling information;

a periodicity of a service for the coordinating UE;

a counter value indicating consecutive resource occupation times of a service for the coordinating UE;

the quantity of retransmission times of a target packet.

17. The resource selection method according to claim 2, wherein a priority value of the sidelink resource coordination information is any one of:

a priority value of a packet to be transmitted by the coordinated UE;

a priority value configured by a higher layer or a preconfigured priority value;

a predetermined priority value, the predetermined priority value being a larger one of a first difference and 0, the first difference being a difference between a priority value of a to-be-transmitted service data packet and a preset value, and the preset value being configured by the higher layer;

a priority value of the sidelink resource coordination request information.

18. The resource selection method according to claim 2, wherein the sidelink resource coordination information is carried on any one of:

2nd-stage Sidelink Control Information (SCI);

Radio Resource Control (RRC) signaling;

a Media Access Control Control Element (MAC CE).

19. The resource selection method according to claim 2, wherein the transmitting the sidelink resource coordination information comprises:

transmitting the sidelink resource coordination information in a second predetermined duration after receiving the sidelink resource coordination request information, and the second predetermined duration is determined in accordance with any one of:

a higher layer configuration or a preconfiguration;

a latest time for receiving the sidelink resource coordination information indicated in the sidelink resource coordination request information;

a start time of a resource indication window for selecting the coordination resource.

20. The terminal device according to claim 12, wherein the sidelink resource coordination information is carried on any one of:

2nd-stage Sidelink Control Information (SCI);

Radio Resource Control (RRC) signaling;

a Media Access Control Control Element (MAC CE).

\* \* \* \* \*